J. LENGEL.
PROTECTING DEVICE FOR EXPLOSION ENGINES.
APPLICATION FILED DEC. 9, 1908.

934,680. Patented Sept. 21, 1909.

INVENTOR:
Julius Lengel,
By Attorneys

WITNESSES:

UNITED STATES PATENT OFFICE.

JULIUS LENGEL, OF WEST PHILADELPHIA, PENNSYLVANIA.

PROTECTING DEVICE FOR EXPLOSION-ENGINES.

934,680.   Specification of Letters Patent.   Patented Sept. 21, 1909.

Application filed December 9, 1908. Serial No. 466,622.

*To all whom it may concern:*

Be it known that I, JULIUS LENGEL, a citizen of the United States, residing in West Philadelphia, city and county of Philadelphia, and State of Pennsylvania, have invented certain new and useful Improvements in Protecting Devices for Explosion-Engines, of which the following is a specification.

My invention aims to provide certain improvements applicable especially to two-cycle explosion or internal combustion engines. The crank shaft bearings of such engines have usually given trouble because of the escape of gas between the shafting and the bearings after the motor has been in use a short while. The gas in the crank case mixes with the grease or other lubricant in the bearings and eats out all the lubricant, causing the bearings to wear rapidly. According to this invention the bearings are made inaccessible to the gas in the crank case, and are also prevented from escaping when the bearing becomes worn. By this improvement the bearings are kept in good order for a long time, and loss of the motive gas is avoided.

The accompanying drawings illustrate an embodiment of the invention.

Figure 1:
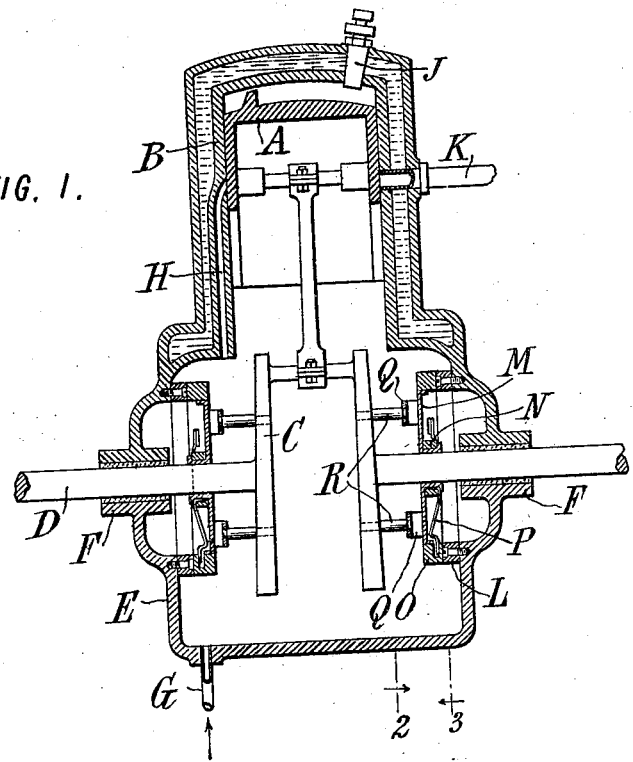
Figure 2:
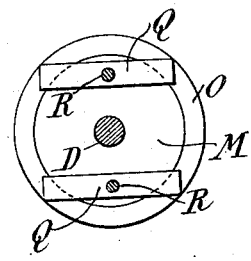
Figure 4:
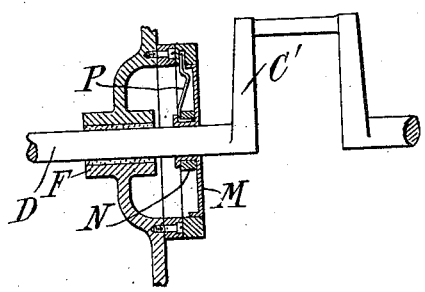
Figure 3:
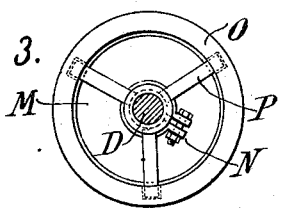

Figure 1 is a longitudinal sectional view through a cylinder and crank case of an engine with my improvements applied thereto. Fig. 2 is a face elevation of the protecting device from the outer side. Fig. 3 is a face elevation of the same from the inner side. Fig. 4 is a sectional view of a slightly modified embodiment of the invention.

Referring to the embodiments of the invention illustrated, the engine has the usual or any suitable piston A reciprocating in a cylinder B and driving a crank C on a crank-shaft D, the crank being carried in a case E provided with bearings F through which the shaft runs, usually to the fly-wheel at one side and to the driven mechanism at the other. The explosive gas or mixture is admitted to the crank case at G and passes thence through the admission passage H to the cylinder in which it is ignited by an igniter J and from which it is discharged through a pipe K. This is the usual construction of two-cycle engine. It explodes on each revolution of the shaft, so that a three-cylinder engine of this type will explode as often as the six-cylinder four-cycle motors which are widely in use for automobiles or similar uses. The two-cycle engine has also the advantage of having no valves and no cam shaft to get out of order. The escape of gas from the crank case after a comparatively short period of use has been however a serious defect which has prevented their becoming more widely used. I propose to obviate these disadvantages by a protecting device of such a design and location as to avoid increasing the friction of the bearings materially and to practically prevent the passage of gas through the bearings or the lubricating material thereof. This protecting device consists, in the embodiment illustrated, of a plate or diaphragm mounted on the shaft just inside of the bearing and engaging at its edge a suitable portion of the crank case with a tight contact. In order to provide a close contact the case E preferably carries a ring L of steel bolted or otherwise fastened thereon, with a finished inner face. The shaft carries a plate M of copper or other suitable flexible material clamped upon the shaft by means of a split collar N and soldered or otherwise hermetically fastened at its outer edge to a ring O of steel having a bearing face engaging the ring L carried by the crank case. The gas in the crank case, subjected to a pressure whenever the piston comes down, presses the plate M outward, so that the steel ring at its edge engages the steel ring on its crank case to make a substantially gas-tight joint.

In order to hold the ring O close against the ring L, springs are preferably provided. For example, flat springs P connected to the split collar N, may have their outer ends engaged with the ring O and pressing the latter always outward, that is to say, against the ring L.

In engines of the type shown in Fig. 1, in which the cranks C extend in both directions from the shaft D, the pressure may be effected also by means of a pair of springs Q approximately M-shaped, fastened to pins R projecting from the adjacent crank. Where, however, a crank of the type shown at C', Fig. 4, is used,—that is to say, a crank at only one side of the shaft,—the use of such pins R would result in an unbalanced or one-sided pressure upon the protecting device.

Consequently in this case the spring Q is omitted and the radial springs P are depended upon to secure the closure.

The protectors described may be applied very readily to existing engines, and they substantially protect the bearings and prevent any material loss of gas. This loss of gas at a rate which increases as the engine gets older is a serious matter, the result of which is that the engine begins to lack power, and in order to get the desired power the carbureter is adjusted to give a richer mixture which is more expensive and less regular in its operation than that for which the engine was designed.

The protector can be introduced in a very narrow space and has the advantage of being concealed within the crank case. It is thought unnecessary to lubricate the engaging faces of the rings O and L, though special provision may be made for this if necessary. Ordinarily no separate provision is necessary, as the surfaces will be oiled to some extent by the surplus oil from the bearing which keeps the shaft oiled and which will be carried out to the rings O and L by centrifugal force.

What I claim is:—

1. A gas engine in which the gas passes through the crank case, and having means for protecting the bearings from the gas, said means comprising a flexible diaphragm extending from the shaft to a portion of the crank case surrounding the bearing and making a substantially rigid gas-tight engagement with the shaft and a tight engagement with said portion of the crank case.

2. A gas engine in which the gas passes through the crank case, and having means for protecting the bearings from the gas, said means comprising a flexible diaphragm rotating with the shaft and having a rigid, gas-tight engagement therewith, and making a tight engagement at its edge with the portion of the crank case surrounding the bearing.

3. A gas engine in which the gas passes through the crank case, and having means for protecting the bearings from the gas, said means comprising a flexible diaphragm rotating with the shaft and having a rigid gas-tight engagement therewith, a ring of metal carried at the edge of said diaphragm, a ring of metal carried by the portion of the crank case surrounding the bearing and having a face which makes a tight sliding contact with the face of the ring carried by the diaphragm.

4. A gas engine in which the gas passes through the crank case, and having means for protecting the bearings from the gas, said means comprising a flexible diaphragm rotating with the shaft and having a rigid gas-tight engagement therewith, a ring of metal carried at the edge of said diaphragm, a ring of metal carried by the portion of the crank case surrounding the bearing and having a face which makes a tight sliding contact with the face of the ring carried by the diaphragm, and a spring pressing one of said rings against the other.

5. A gas engine in which the gas passes through the crank case, and having means for protecting the bearings from the gas, said means comprising a flexible diaphragm rotating with the shaft and having a rigid gas-tight engagement therewith, a ring of metal carried at the edge of said diaphragm, a ring of metal carried by the portion of the crank case surrounding the bearing and having a face which makes a tight sliding contact with the face of the ring carried by the diaphragm, and springs P attached at their inner ends and having their outer ends in engagement with the ring carried by the diaphragm so as to press said ring against the ring carried by the crank case.

6. A gas engine in which the gas passes through the crank case, and having means for protecting the bearings from the gas, said means comprising a flexible diaphragm rotating with the shaft and having a rigid gas-tight engagement therewith, a ring of metal carried at the edge of said diaphragm, a ring of metal carried by the portion of the crank case surrounding the bearing and having a face which makes a tight sliding contact with the face of the ring carried by the diaphragm, and springs Q on the outer face of the diaphragm and engaged by projecting portions of the crank to press the edge of said diaphragm toward the crank case.

In witness whereof, I have hereunto signed my name in the presence of two subscribing witnesses.

JULIUS LENGEL.

Witnesses:
A. C. BUZBY,
JOHN D. ULMER.